United States Patent [19]

O'Neal

[11] 4,195,738
[45] Apr. 1, 1980

[54] APPARATUS FOR TRANSPORTING GLASS SHEETS AND THE LIKE

[76] Inventor: John O'Neal, 24982 Thompson Rd., Perrysburg, Ohio 43551

[21] Appl. No.: 826,390

[22] Filed: Aug. 22, 1977

[51] Int. Cl.² ................................................ B60P 3/00
[52] U.S. Cl. ......................................... 211/41; 296/3; 105/367
[58] Field of Search .......................... 211/41; 206/449; 280/179 R; 296/3; 105/367

[56] References Cited

U.S. PATENT DOCUMENTS

| | | | |
|---|---|---|---|
| 2,940,402 | 6/1960 | Hansen et al. | 296/3 X |
| 3,424,487 | 1/1969 | Pector et al. | 296/3 X |
| 3,839,198 | 6/1958 | Lefevre | 211/41 |
| 3,848,917 | 11/1974 | O'Neal | 296/3 |
| 3,921,538 | 11/1975 | Bundy | 206/449 X |
| 4,037,870 | 7/1977 | O'Neal | 296/3 |

FOREIGN PATENT DOCUMENTS

| | | | |
|---|---|---|---|
| 2400559 | 9/1974 | Fed. Rep. of Germany | 206/449 |
| 1234671 | 6/1971 | United Kingdom | 211/41 |
| 451598 | 12/1974 | U.S.S.R. | 206/449 |

Primary Examiner—Roy D. Frazier
Assistant Examiner—Robert W. Gibson, Jr.
Attorney, Agent, or Firm—Wilson, Fraser, Barker & Clemens

[57] ABSTRACT

An improved device for securing stacks of large glass sheets for over-the-road movement is disclosed. The device includes a main truck trailer frame providing a floor and generally vertical central support for one or more large sheets in generally vertical position. A fixed guide bar extends the length of the frame behind the central support and laterally extending rails are removably secured to the guide bar adjacent the opposed vertical edges of the sheet. A longitudinal rail is adjustably secured to the outer ends of the lateral rails to extend across the outer face of the sheets and means are provided to draw both the lateral and longitudinal rails against the glass sheets to hold it securely against movement. An especially designed bracket is used to secure the lateral rails to the fixed guide bar and longitudinal rail to also provide for vertical adjustment of the height of the lateral and longitudinal rails to accommodate various sized glass sheets.

8 Claims, 5 Drawing Figures

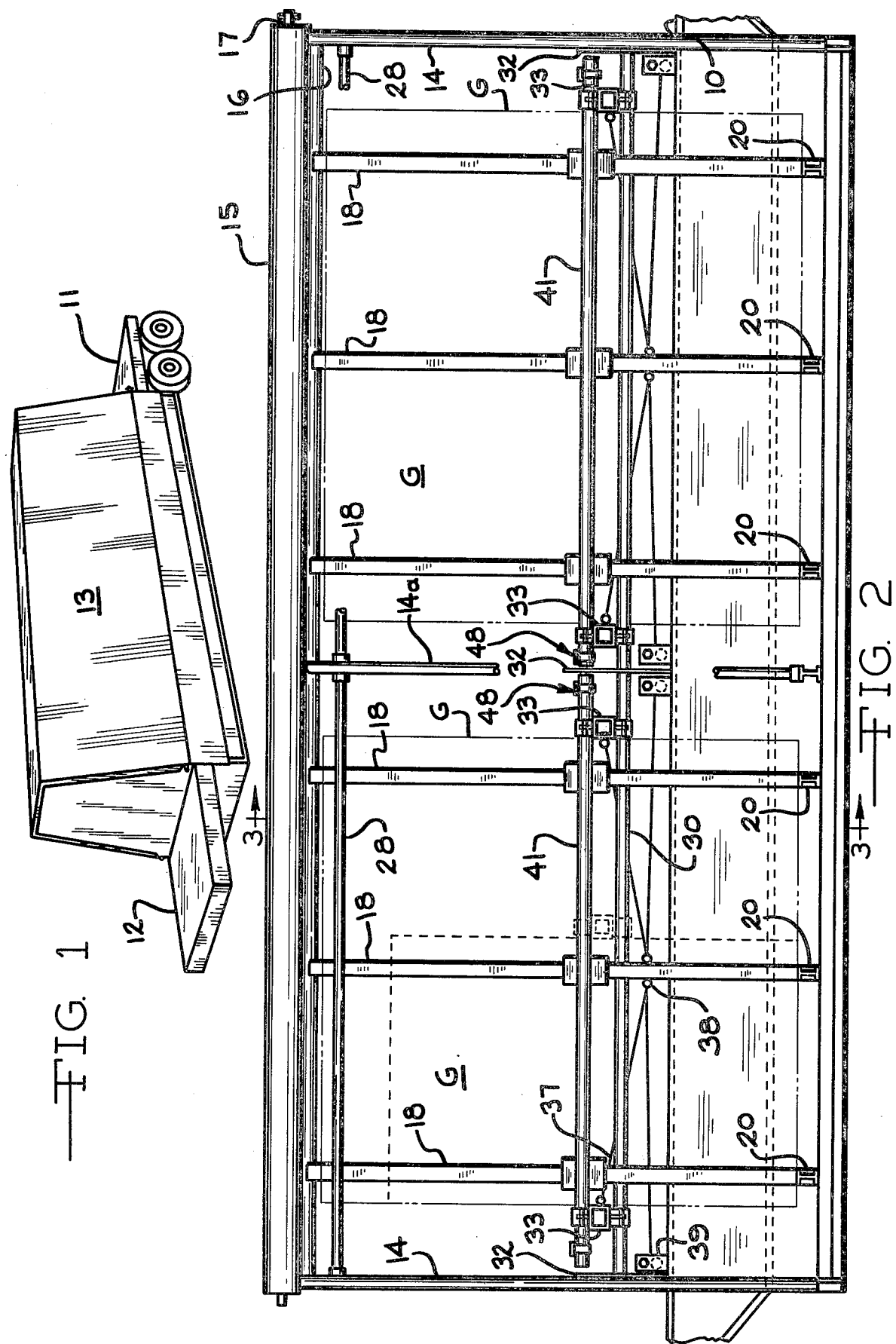

APPARATUS FOR TRANSPORTING GLASS SHEETS AND THE LIKE

BACKGROUND OF THE INVENTION

This invention relates to improvements in apparatuses for transporting large rigid sheets of material and is particularly useful for transporting large sheets or panes of flat glass.

Modern architechural trends emphasize the use of very large sheets of flat glass and, recent energy conservation measures have dictated the increased use of double insulation glass sheets. Such large sheets and particularly double insulated sheets are manufactured in a limited number of locations for use throughout the country and are particularly difficult to transport because of their size and fragility. Sheets as large as 12 feet in width and 20 feet in length are commonly transported and, because of their weight, must be moved in a stack in generally vertical position.

Once such apparatus for transporting such sheets is shown in my issued U.S. Pat. No. 3,848,917 which discloses the general concept of an A-frame trailer in which the lower edges of a vertical stack of sheets are positioned only a short distance above the roadway to allow for normal road clearance of, for example, 13 feet 6 inches.

Another improvement in the art of transporting such glass sheets is shown in my issued U.S. Pat. No. 4,037,870 which discloses the general concept of a trailer having a rigid frame as in the aforementioned patent with a series of clamping devices for holding the stacked sheets against lateral and longitudinal movement. The instant invention is an improvement over the devices shown in my aforementioned patents which permits the operator to easily and rapidly adjust his rig to carry any number of sheets of variable sizing from a maximum size, dictated by the length of the trailer, to a minimum size down to the point where no vertical transportation would be necessary.

SUMMARY OF THE INVENTION

The invention disclosed herein is generally characterized as an improved clamping system adapted to be used with multiple sizes of glass sheets in a stack of one or more, which clamping system can be used to securely but releasably position the glass sheets in a generally vertical array upon a rigid A-frame trailer of the type previously described. The improvement includes a longitudinally extending fixed guide bar secured to the rigid frame of the trailer and extending behind the vertical portions of the trailer frame upon which one side of the glass is supported. Releasably attached and adjustably positioned along the fixed guide bar are one or more lateral rails which extend alongside the edges of the sheet or stack of sheets outwardly beyond the outermost face thereof. A longitudinal rail extends horizontally along the outermost face and is rigidly but releasably secured to the ends of the lateral rails so that the glass sheet or stack of sheets is positioned between the longitudinal rail and the rigid trailer frame with a lateral rail at each edge thereof. Means are provided for drawing the lateral rails snugly against the edges of the sheets and for moving the longitudinal rail against the outer face of the sheet or stack of sheets so that the sheet or stack is snugly positioned against movement during the transport of the glass. A specially designed bracket is used to secure the lateral rails to the fixed guide bar and the longitudinal rail. The bracket is designed to be reversibly positioned to enable the operator to adjust the height of the lateral rails and longitudinal rail, depending upon the size of the glass sheet being transported.

It is accordingly an object of this invention to provide an improved apparatus for releasably securing large planar objects, such as glass sheets, within an open rigid frame of a trailer, such apparatus being adjustable to enable it to accomodate and secure a wide range of sizes without modification of the trailer bed and to be able to be quickly and simply secured and released by the operator of the trailer or warehouse men, etc.

Other objects and advantages of the invention will be apparent to those skilled in this art from the following detailed description of a preferred embodiment, with reference being made to the accompanying drawings.

DESCRIPTION OF THE DRAWINGS

FIG. 1 is a simplified view in perspective of a semitrailer containing the glass securing apparatus of this invention, showing a removeable cover in place;

FIG. 2 is a side view in elevation of the central portion of the semi-trailer of FIG. 1, with the cover removed or rolled up to show some of the structural details thereof;

DETAILED DESCRIPTION OF A PREFERRED EMBODIMENT

Figure 3:
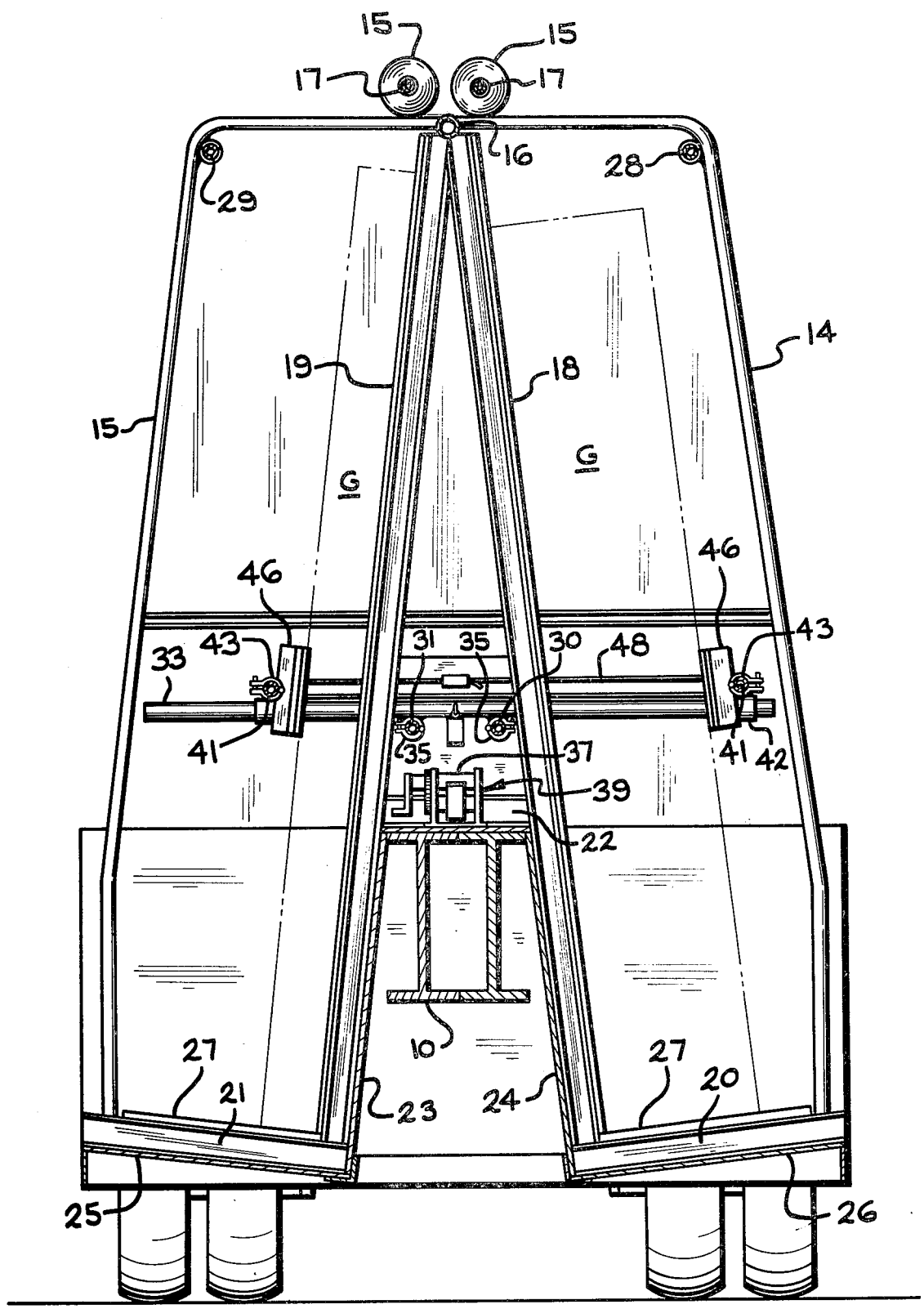
FIG. 3 is a cross sectional end view of the semi trailer section, taken along line 3—3 of FIG. 2.
Figure 4:
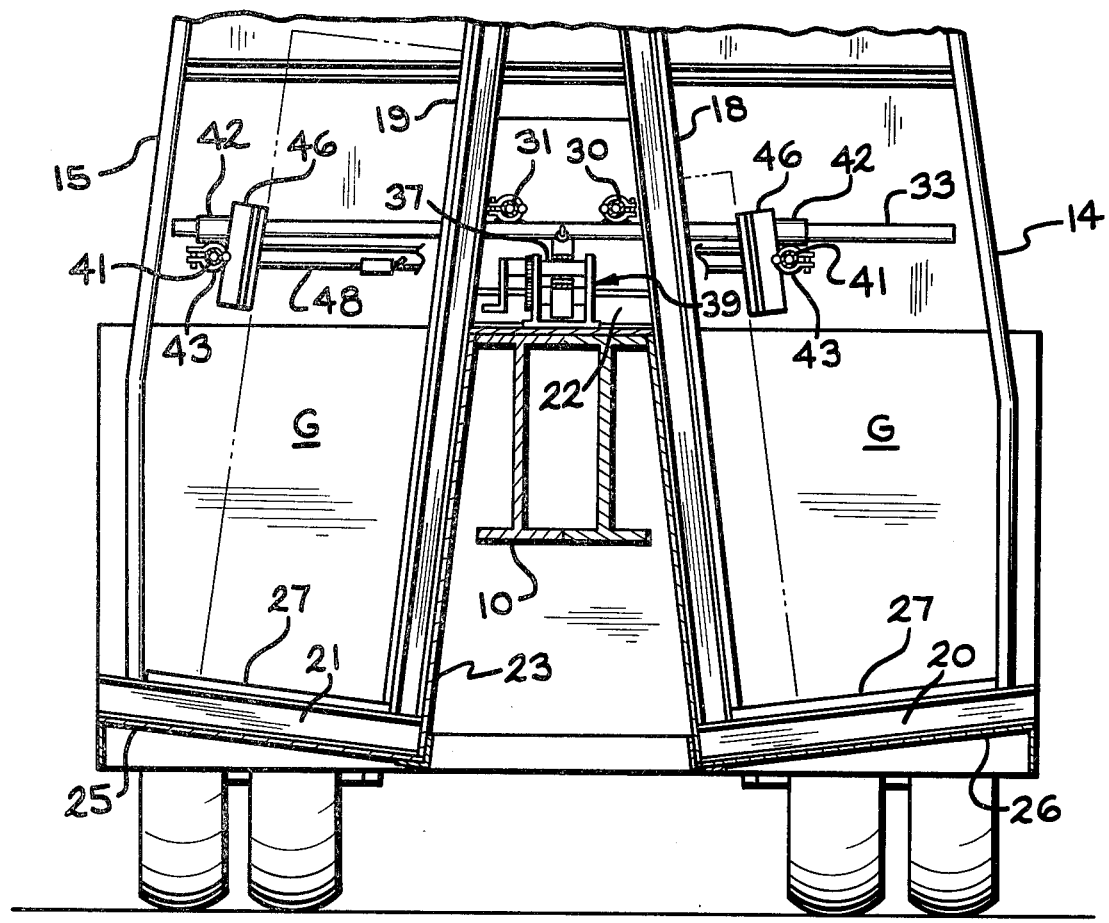
FIG. 4 is a portion of a cross sectional end view similar to FIG. 3 but showing some of the apparatus of the invention used in a different position.

FIG. 1 schematically illustrates a semi-trailer bed in which the central portion is designed to receive large planar objects such as sheets of flat glass. The semi-trailer bed is conventional in that it includes a longitudinally extending central support beam 10 (seen in cross section in FIGS. 3 and 4) which supports a rear platform 11 and a front platform 12. Both the front and rear platforms 11 and 12 may be used for additional hauling or as a work area during the loading and unloading of the trailer. The fifth wheel of the semi-trailer (not shown) would be supported below platform 12. It is to be understood that additional tandem axles may be positioned along the length of the trailer as desired. The central section of the trailer concerns the mechanism of this invention and is shown in FIG. 1 as being covered by a removeable cover 13. As seen in FIG. 3, external cover rails 14 extend around the outer sides and upper portions of the central portion of the trailer to provide a frame supporting the removeable cover which, in this instance, is shown as a rolling canvas-type cover. Each side of the trailer is provided with a cover roll 15 which extends the longitudinal length of the trailer as seen in FIG. 2 with one end secured to a longitudinally extending cover support tube 16. One or both ends of the central cover roller 17 is provided with a suitable hand crank or other actuation means for rolling or unrolling the cover from the open position shown in FIG. 3 to the closed position shown in FIG. 1. A suitable guide track or other securing means can be used at the edges of the cover 13 to provide a rolling seal with the cover rails 14 as desired. The cover may be moved from its closed to its open position simply and quickly by a single worker who stands on either the front or rear platforms 12 or 11 and rolls or cranks the cover to its upward position as shown in FIG. 3. In situations where the cargo of the trailer is flat glass, a cover is important to prevent flying road objects or thrown stones from striking the glass during transit.

Referring now to FIG. 3, the central portion of the trailer includes a "A" frame made up of pairs of vertical frame beams 18 and 19 welded or otherwise secured at their top ends and extending downwardly towards a floor on each side of the support beam 10. The floor on each side includes a number of floor beams 20 or 21 secured to the lowers ends of the vertical beams 18 or 19 and extending upwardly in an outward direction as shown. Each of the pairs of vertical beams 18 and 19 is joined by a horizontal central strut 22 to form a rigid A frame which rests upon the support 10 which extends the length of the trailer. As best seen in FIG. 2, the entire trailer frame is comprised of a number of pairs of vertical beams 18, 19, etc., which are joined at their upper ends by a cover support tube 16 or similar member and at their lower ends by similarly extending longitudinal members. Interior plates 23 and 24 are secured to the inner sides of the beams 18 and 19 while bottom plates 25 and 26 are similarly attached to the lower edges of the floor beams 20 and 21 to provide an effective skirt against road debris from entering the trailer. A support floor 27 of a somewhat resilient material such as wood or dense rubber extends across the tops of the floor beams 20 and 21 to provide an area upon which the load will rest. As previously mentioned, the cover rails 14 have their lower ends secured to the outer edges of the floor beams 20 or 21 and are also attached to longitudinally extending cover braces 28 and 29 at the upper most corners to provide a rigid frame for supporting the cover. As seen in FIG. 2, a central cover rail 14A is shown in this embodiment, thus separating the open area of the side of the trailer into two sections through which the load such as large glass sheets can be moved without interference. If desired, this central cover rail 14A and the longitudinal cover braces 28 and 29 can be removeably secured so that a larger load may be accomodated in the trailer. The entire fixed frame is thus far described is secured to the longitudinal main support beam 10 to thus support it on the trailer, in the manner described in the previously mentioned issued patents.

Figure 5:
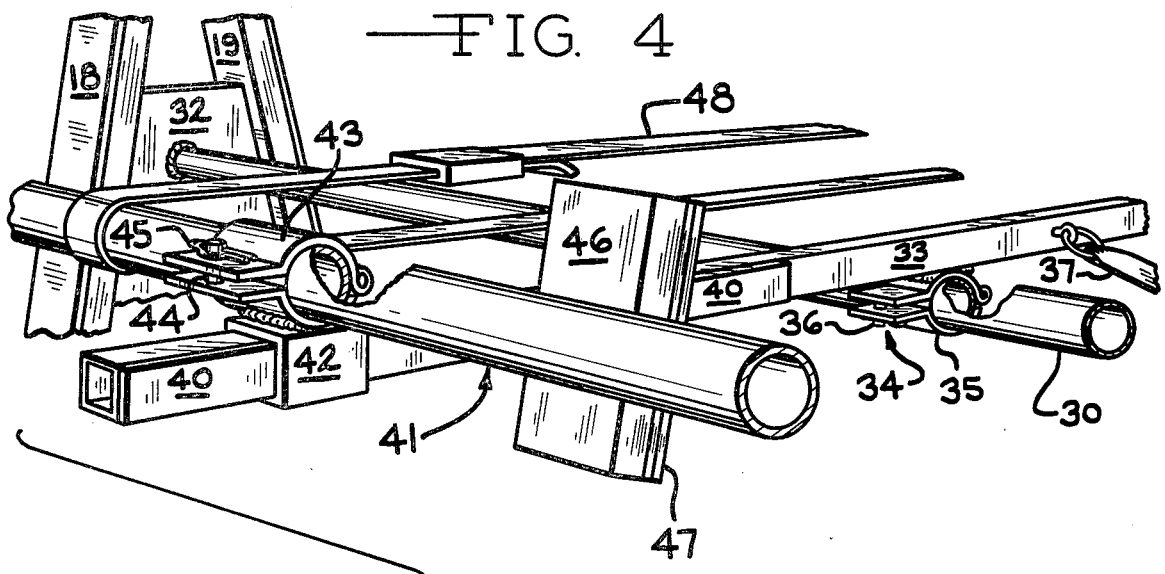
FIG. 5 is a view in perspective illustrating in detail portions of the clamping apparatus which forms a part of the invention.

Referring now to FIGS. 2 and 3, a fixed guide bar 30 or 31 extends longitudinally of the entire central portion of the trailer on each side of the vertical center line and within the space defined by the pairs of vertical beams 18 and 19. These fixed guide bars are rigidly secured to fixed structural members between the vertical beams 18 and 19 and are spaced from the inner edges of these members as shown in FIG. 3. FIG. 5 schematically shows the guide bar secured to an internal yoke 32 extending between frame members 18 and 19. Most desirably, the yoke 32 or similar member would be secured to the guide bar only at the central portion and end portions of the trailer, so that the major length of the guide bar 30 is unattached to the vertical frame members 18 or 19 which it passes along side.

A plurality of lateral rails 33 shown as being square or rectangular in cross section extend transversely of the trailer bed and are supported on a slidable bracket 34. As best seen in FIG. 5, the bracket 34 includes a slidable release bearing 35 formed of two semicircular halves hinged at one side and secured together on the other side by a releasible pin 36 or other similar device. As will be seen in FIG. 5, the lateral rail 33 is rigidly secured as by welding at right angles to the axis of the release bearing 35 so that it may be positioned longitudinally along the fixed guide bar 30 by sliding it along that member and the entire lateral rail 33 can be removed by opening the release bearing 35 and lifting if off. FIG. 3 illustrates one of the lateral rails 33 extending from on side of the trailer to the other, supported on both of the fixed guide bars 30 and 31 by the release bearings 35. FIG. 2 illustrates four of the lateral rails 33 positioned at intervals along the fixed guide bar 30 to accommodate two separate stacks of glass, as illustrated in phantom. It should now be apparent that because the lateral rails 33 are longitudinally positionable anywhere along the fixed guide bars 30 and 31, that they can be moved to accommodate any size of glass sheet up to the total effective length of the trailer, and that more guide rails 33 can be added to accommodate a multiplicity of smaller loads. Finally, FIG. 2 schematically shows a mechanism for securing the sliding lateral rails 33 snugly against the vertical outer edges of a stack of glass sheets. A woven strap 37 or other suitable tension member such as a cable has one end secured to the central portion of the interior face of the lateral rails 33 (also shown in FIG. 5), is reaved through a pulley or eye 38 near the center of the load and has its other end connected to a hand winch or other payout device 39. This strap or cable connection and winch is repeated at the other end of the trailer and at the central portion thereof, as shown in FIG. 2. With a glass load G, as shown in phantom in FIG. 2, positioned on one or both sides of the trailer A-frame, the winches 39 are activated to wind up the strap 37 to thus draw the lateral rails 33 against the edges of the load and to keep them there in snug contact to prevent longitudinal movement of the load during transit. As shown in FIG. 5, the edge of the lateral rails 33 adjacent the glass load is desirably provided with an edge pad 40 of a resilient material such as hard rubber which will firmly grip the edge of the glass stack without chipping or otherwise damaging it.

Referring again to FIG. 2, a longitudinal clamping rail 41 extends across the outer surface of each glass load and is supported by the pairs of lateral rails 33 on each side of the glass load. The details of the construction and attachment of these clamping rails 41 are schematically shown in FIG. 5. A bracket similar to bracket 34 is used to slidably attach the clamping rail 41 transversely across the end of the lateral rail 33. This bracket has a square bearing 42 which is secured as by welding to a circular release bearing 43 comprised of two semicircular halves hinged at one side and releasably connected together by a bolt 44, cotter pin 45 or other suitable releasible attachment. The axis of the aperture in the square bearing 42 is at right angles to the axis of the release bearing 43 as shown so that the clamping rail 41 will extend at right angles to its supporting lateral rails 43, across the outer face of the glass. Also shown in FIG. 5 is one of a plurality of clamp blocks 46 having a resilient inner face 47 which bears against the external surface of the glass or its packing. The clamp block 46 can be secured as by welding to the clamp rail since the rail 41 can turn within the release bearing 43 to adjust to the proper angle for the clamp block 46 against the glass load. Finally, also shown in FIG. 5 is a clamping strap 48 which is led around the outside of the clamping rails 41 on either side of the truck bed and then tightened, as by a winch or other suitable device to draw together the clamping rails 41 to prevent lateral outward movement of the glass load. It is to be understood that the clamping strap 48 can have one end secured to a fixed member in the trailer, such as the fixed guide bar 30 and need not necessarily extend across the trailer between the opposed clamping rails 41.

Having thus described the mechanism in detail, the manner in which it is used to secure a load of glass will be briefly summarized, it being understood that the unloading procedure would generally be the reverse of the following description. When the truck is ready to be loaded, the clamping rails 41 have been removed and the lateral rails 33 positioned to accomodate the longitudinal length of the load. If a single extraordinarily large piece of glass is be loaded in one side of the trailer, the interior lateral rails 33 are removed, the outer rails 33 are moved to their extreme positions to expose the entire side of the trailer for loading this piece. Once the glass pack has been positioned, with its lower edge resting on the support floor 27 and leaning on the vertical frame beams 18 or 19, as illustrated in FIG. 3, the lateral rails 33 are drawn into contact with the edges of the stack, by the winch 39 and cable mechanism 37 previously described. Next, the square bearing 42 of the bracket is slipped on the distal end of the lateral rails 33 and drawn generally up against the outer surface of the glass load. The release bearings 43 are opened, the longitudinal clamping rail 41 is put in place, and the clamping strap 48 is cinched or tightened to complete the loading.

Several advantages of the aforementioned structure should be noted. The bracket including the square bearing 42 and release bearing 43 which connects the clamping rail 42 to lateral rails 33 is reversable in the sense that it can be installed upon the lateral rail 33 upside down from its position shown in FIG. 5; this has the effect of positioning the clamp block 46 vertically lower upon the glass load, making the entire rig adjustable in vertical height. Secondly, the bracket 34 which connects the lateral rails 33 with the fixed guide bar 30 may also be installed in a reverse position from that shown in FIG. 5 so that the lateral rails 33 are below the fixed guide bar 30, thus further adjusting the vertical height of the clamp block 46. In the FIG. 5 illustration, the clamp block 46 is positioned in its highest position. Using this combination of reversable brackets there are four possible vertical adjustments which could be made to accomodate various vertically sized glass sheets.

Finally, it will be appreciated that once the trailer is fully unloaded, all of the moveable securing members can be removed from the trailer to facilitate cleaning, maintainance or other access. A given trailer can be equiped with a plurality of interchangeable brackets, lateral rails, and longitudinal rails to accomodate almost any size load and can be quickly and easily set up when changing from one load to another.

Other objects and advantages of the above-described invention will be apparent to those skilled in the art in that various changes to the preferred embodiment described can e made without departing from the scope of the following claims.

What I claim is:

1. In a device for transporting large planar sheets of rigid material in a generally vertical position including a fixed generally vertical support adjacent the inner face of such planar sheets, the improvement comprising a horizontal guide extending longitudinally of such transporting device behind said fixed support, at least one lateral rail slidably and removably positioned upon said horizontal guide and extending laterally outwardly alongside the vertical edges of such planar sheets, winch means for moving said lateral rail along said horizontal guide and into engagement with the vertical edges of such planar sheets and for maintaining said lateral rail in such engagement, thereby restraining such sheets from longitudinal movement, a longitudinal rail slidably positioned on the outer end of said lateral rail and extending across the outer face of such planar sheets and means independent of said winch means for moving said longitudinal rail against the outer face of such planar sheets and for holding it there, thereby restraining such sheets from lateral movement, whereby such sheets are restrained against movement during transport.

2. The device of claim 1 wherein said longitudinal rail is slideably supported on said lateral rail by a connector bracket, said bracket having a first bearing opening complementarily shaped to slide over said lateral rail and a second bearing opening positioned at right angles and closely adjacent below said first bearing opening and complementarily shaped to slide over said longitudinal rail to thus position said longitudinal and lateral rails normal to one another.

3. The device of claim 2 wherein one of said bearing openings is comprised of releasable portions which may be opened to receive its complementarily shaped rail and then secured together upon said rail.

4. The device of claim 2 wherein one of said bearing openings and its complementarily shaped rail are non-circular in cross-section.

5. In a device for transporting large planar sheets of rigid material in a generally vertical position including a fixed longitudinal central support having generally vertical outer faces to support on either side the inner face of a stack of such planar sheets, the improvement comprising at least one fixed horizontal guide extending longitudinally of such transport device within such fixed central support between the opposed outer faces thereof, at least one lateral rail slidably and removably positioned upon said horizontal guide and extending laterally outwardly alongside the vertical edges of such planar sheets on each side of said central support, cable means for moving said lateral rail along said horizontal guide and into engagement with the vertical edges of such planar sheets and for holding it there to retain such sheets against longitudinal movement, a longitudinal rail slidably positioned on the outer ends of said lateral rail and extending across the lateral faces of such stacks of planar sheets on each side of said central wall and means independent of said first recited means for moving said longitudinal rail against the outer face of such planar sheets and for holding it there, thereby restraining such sheets from lateral movement, whereby such sheets are restrained against movement during transport.

6. The device of claim 5 wherein said longitudinal rails are slideably supported on said lateral rail by a connector bracket, said bracket having a first bearing opening complementarily shaped to slide over said lateral rail and a second bearing opening positioned at right angles and closely adjacent below said first bearing opening and complementarily shaped to slide over said longitudinal rail to thus position said longitudinal and lateral rails normal to one another.

7. The device of claim 6 wherein one of said bearing openings is comprised of releasable portions which may be opened to receive its complementarily-shaped rail and then secured together upon said rail.

8. The device of claim 6 wherein one of said bearing openings and its complementarily shaped rail are non-circular in cross-section.

* * * * *